No. 676,799. Patented June 18, 1901.
J. McLOUGHLIN.
GLASS COUNTER BLANK.
(Application filed May 24, 1899.)
(No Model.)
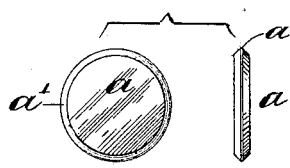
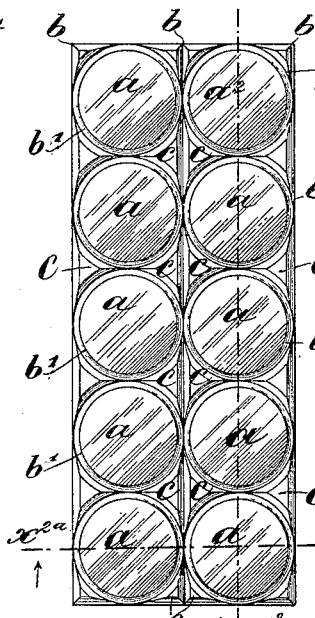
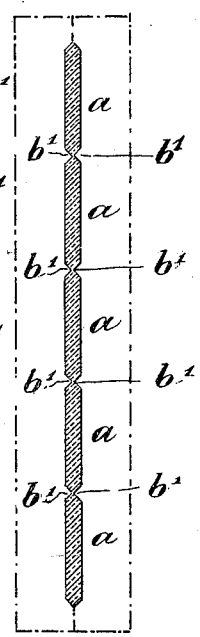
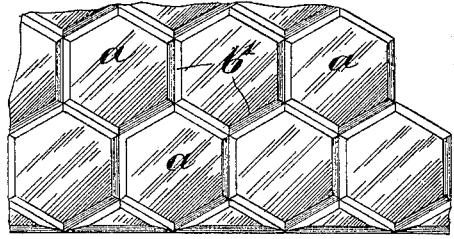
WITNESSES:
J. W. Wiman
Peter N. Ross
INVENTOR
James McLoughlin
BY
Hiram Connett
ATTORNEY
THE NORRIS PETERS CO., PHOTO-LITHO., WASHINGTON, D. C.

UNITED STATES PATENT OFFICE.

JAMES McLOUGHLIN, OF LARCHMONT, NEW YORK.

GLASS COUNTER-BLANK.

SPECIFICATION forming part of Letters Patent No. 676,799, dated June 18, 1901.

Application filed May 24, 1899. Serial No. 717,998. (No model.)

*To all whom it may concern:*

Be it known that I, JAMES McLOUGHLIN, a citizen of the United States, residing at Larchmont, in the county of Westchester and State of New York, have invented certain new and useful Improvements in Glass Counter-Blanks, of which the following is a specification.

This invention relates to the manufacture from glass of blanks for making circular and polygonal counters.

In some games, and notably that called "Lotto," the counters or pieces used by the players are of glass for the reason that they are required to be transparent, and ordinarily from economical necessity they are made by cutting up a thin sheet of glass into small squares. This form of counter is not satisfactory for various reasons, and attempts have been made to produce such transparent counters of circular or rounded contour and of such form that they may be conveniently handled and yet obtainable at a price low enough to permit of their commercial use; but so far as known this result has not been obtained up to this time.

The present invention has for its object to produce such glass counters of circular or polygnal form, as desired, and at a very low cost.

In carrying out the invention in the preferred way the molten glass is pressed between flat mold-plates, which have on them V-shaped ribs placed oppositely and adapted to cut nearly through the glass along the desired contour lines. The counter-blank thus formed is then broken along the lines of the breaking-creases formed by the ribs on the mold-plates and the separated counters rumbled to remove any slight fin or projections formed at the break.

In the accompanying drawings, which illustrate the carrying out of the invention in practice, Figure 1 represents a circular glass counter constructed according to this invention, the counter being seen in side and edge view; and Fig. 1ª represents the counter as resting on a flat surface and illustrating the utility of its V edge. Fig. 2 shows a blank containing two strips of counters; and Fig. 2ª is a cross-section of the same, taken on line $x^{2a}$ in Fig. 2. Fig. 3 is a longitudinal section on line $x^3$ in Fig. 2. Fig. 4 is a fragmentary view showing another arrangement of the circular counters in the blank. Fig. 5 is a view similar to Fig. 4, showing how hexagonal counters may be formed according to this invention.

Referring primarily to Figs. 1, 2, and 3, $a$ is a circular counter having a somewhat V-shaped edge $a'$, whereby when it lies on its face, Fig. 1ª, the fingers may take under the edge, so as to lift or pick it up conveniently. This is quite difficult to do where the counters are square on their edges.

The manner of making the counters is best illustrated in Fig. 2, wherein they are shown arranged in rows, the counters in one row being opposite to those in the other row and the two rows forming strips which are separated by straight V-shaped breaking-creases $b$, so that the strips may be first separated by breaking along said creases $b$. Each counter $a$ is also circumscribed by V-shaped creases $b'$, which intersect the creases $b$ and also the creases $b'$ about the next adjacent counter. The counters may be separated along the creases $b'$ by any suitable means, but preferably by passing them between rolls having coverings of some soft material, as rubber or leather. The small triangular pieces $c$ are waste. After the counters are properly separated, as described, they are rumbled in order to remove any roughness along the V edge ($a'$ in Fig. 1) of the counter.

It will be understood that the two plates of the mold (indicated by dotted lines in Fig. 3) form registering creases $b$ and $b'$ in both faces of the blank, leaving the glass extremely thin along the line of the break. Indeed, it is preferable to so construct the ribs on the mold-plates that they will cut through or practically through the glass at points in the groove $b'$, where it is most difficult to bring the proper strain on the glass to break it.

While it is preferable for convenience in separating the counters to arrange them in like rows in the blank, as in Fig. 2, and separate the strips thus formed by opposite creases $b$, yet they may be arranged in the blank as shown in Fig. 4, where the counters of one row are arranged opposite the spaces in the adjacent row, and the creases $b'$ of one row intersect or merge into those of the adjacent row.

Circular counters are preferred; but those having a polygonal form, if they have V edges, will serve quite well, and these may be made in a creased blank according to the present invention, as shown in Fig. 5. In this view the counters are hexagonal and the breaking-creases intersect, as in Fig. 4.

I am well aware that it is a common practice to mold glassware with depressions or creases in the face thereof for ornamental purposes, and I make no claim to this. The present invention resides in a thin blank of glass having registering breaking-creases in its opposite faces and about the counters, these opposite creases so nearly meeting as to form breaking-lines through ties of thin frangible material about the counters, whereby these latter may be readily separated. The glass need not be and preferably will not be annealed after the blank is formed.

Counters of proper form or desirable form may be made in the manner above described at a less cost than the common square counters of undesirable form cut from sheets of glass and very much cheaper than circular or polygonal counters can be cut from sheets of glass.

Having thus described my invention, I claim—

1. A glass counter-blank consisting of a flat, relatively thin plate, having rows of counters defined and separated from each other by V-shaped, intersecting breaking-creases in its opposite faces, whereby the rows of counters may be separated by breaking the glass along said creases, and the counters of each row may be separated in the same manner, substantially as set forth.

2. A glass counter-blank consisting of a flat, relatively thin plate, having registering, V-shaped, intersecting, circular breaking-creases $b'$, in its opposite faces and about the circular counters, and registering, V-shaped breaking-creases $b$, between the rows or strips of counters, substantially as set forth.

3. An elongated glass counter-blank consisting of a flat, thin plate, having londitudinally-extending, registering, breaking-creases $b$, in its opposite faces, and circular, registering breaking-creases $b'$ in its opposite faces and about the several circular counters, said creases $b'$ intersecting with each other and with the creases $b$, and said registering creases nearly meeting, whereby the circular counters are connected by thin, frangible ties along their lines of separation, substantially as set forth.

In witness whereof I have hereunto signed my name, this 22d day of May, 1899, in the presence of two subscribing witnesses.

JAMES McLOUGHLIN.

Witnesses:
   PETER A. ROSS,
   HENRY CONNETT.